(No Model.) 3 Sheets—Sheet 1.
E. H. JOHNSON.
POWER TRANSMITTING DEVICE FOR ELECTRIC RAILWAYS.
No. 450,744. Patented Apr. 21, 1891.
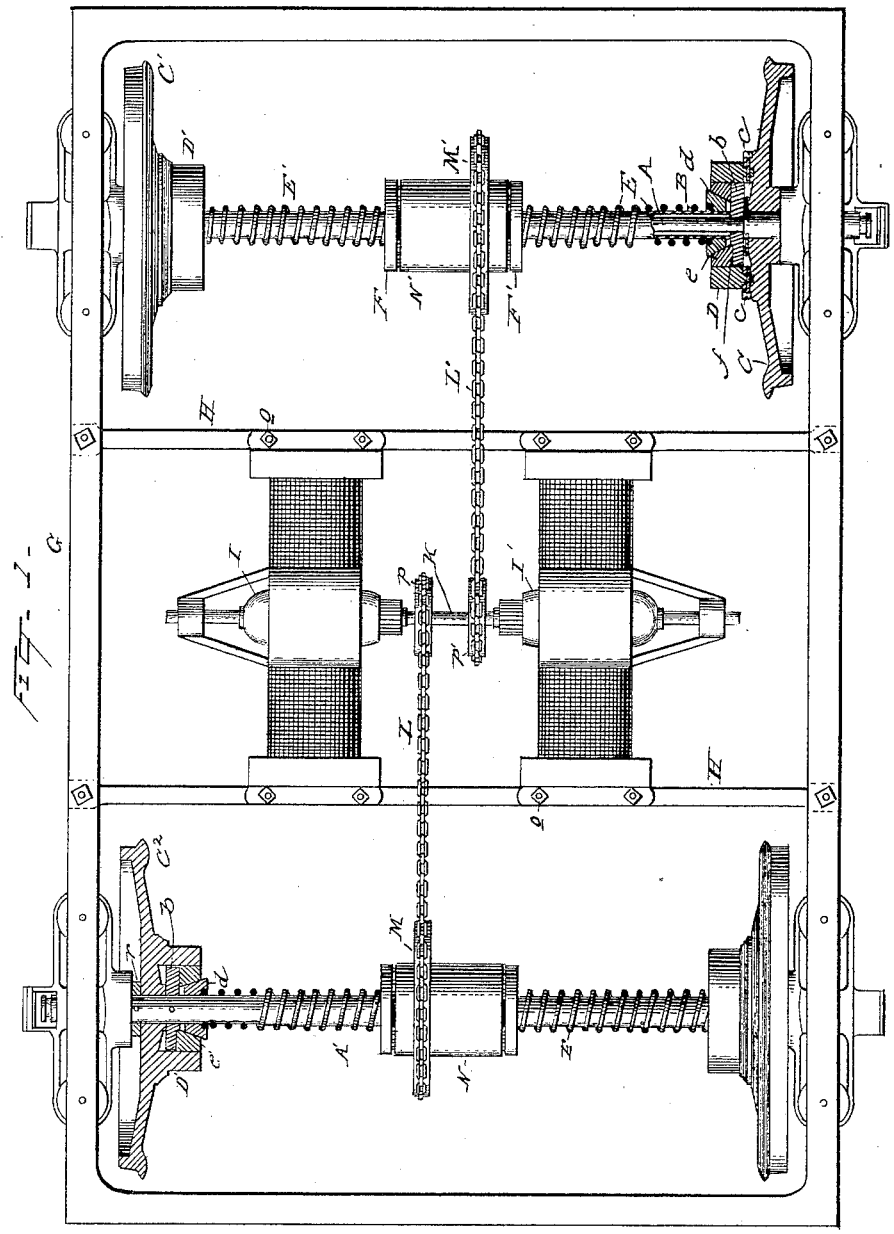

(No Model.) 3 Sheets—Sheet 2.
E. H. JOHNSON.
POWER TRANSMITTING DEVICE FOR ELECTRIC RAILWAYS.
No. 450,744. Patented Apr. 21, 1891.
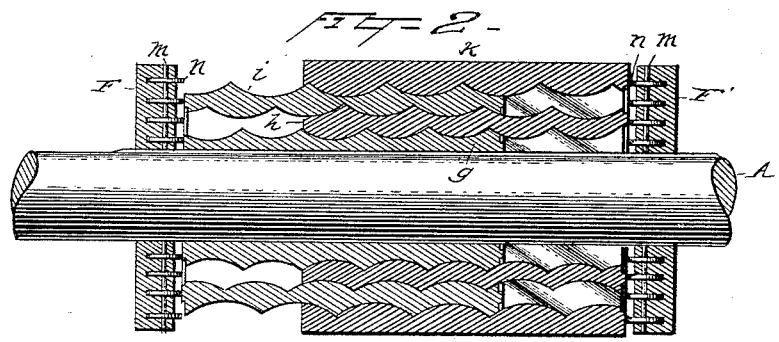
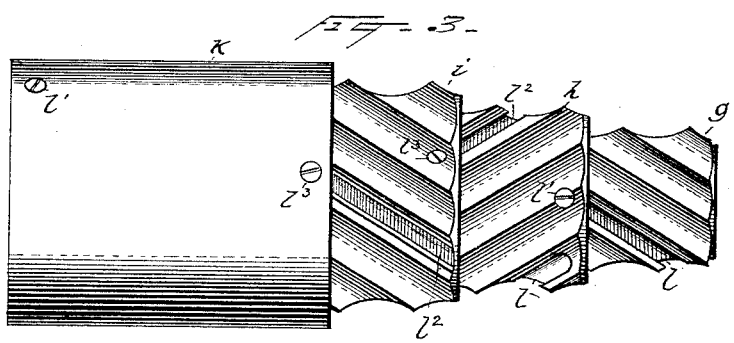
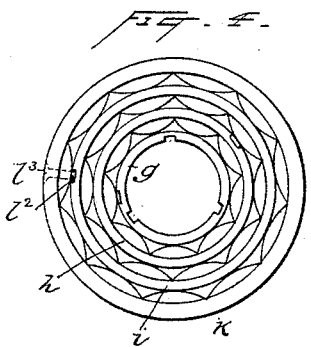
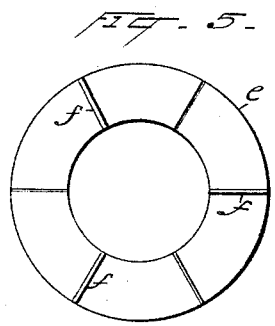
Witnesses
Norris A. Clark
W. Pfizer
Inventor
Edward H. Johnson
By his Attorney (No Model.) 3 Sheets—Sheet 3.
E. H. JOHNSON.
POWER TRANSMITTING DEVICE FOR ELECTRIC RAILWAYS.
No. 450,744. Patented Apr. 21, 1891.
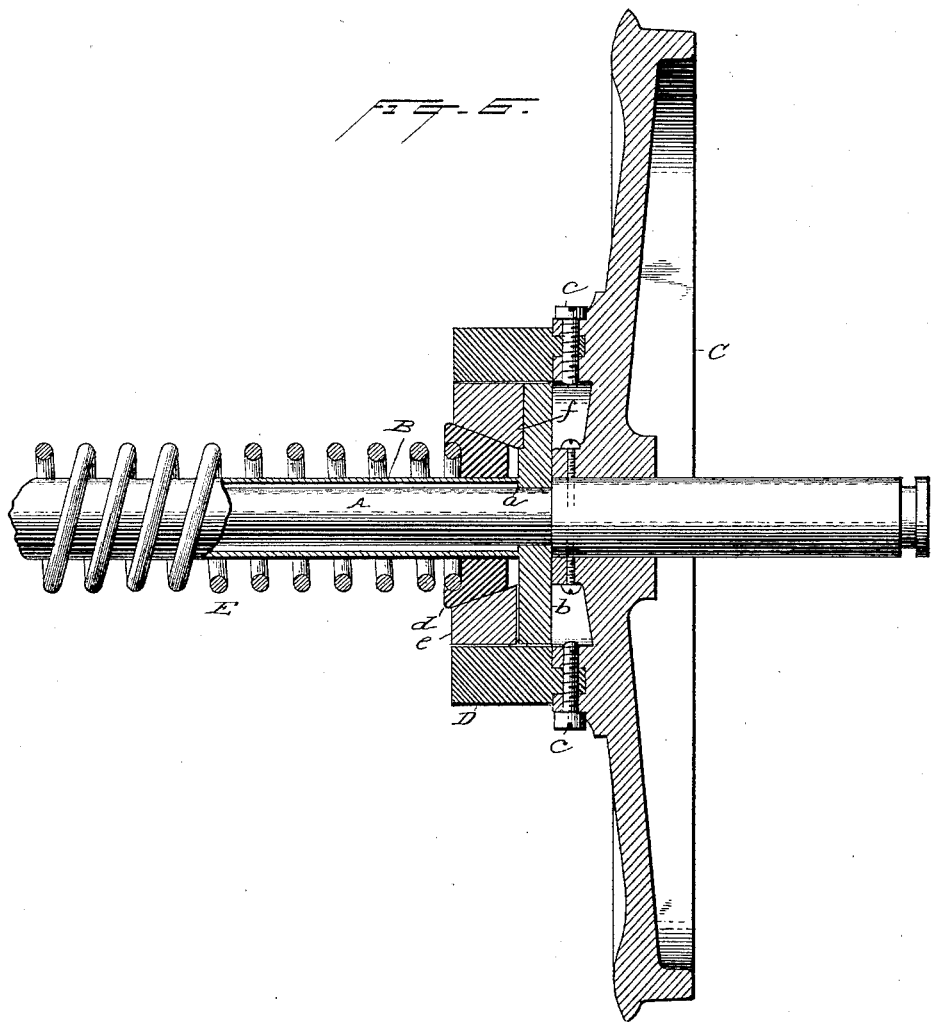
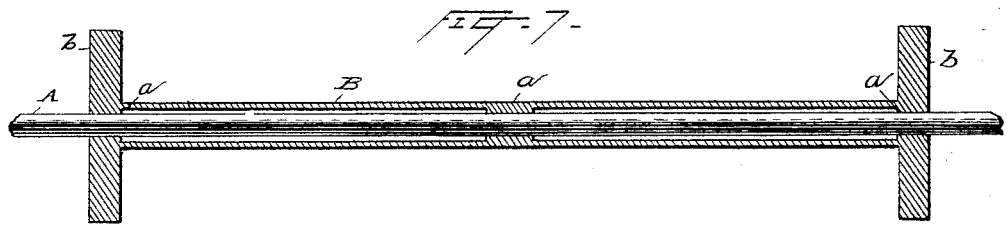
Witnesses
Norris A. Clark
Inventor
Edward H. Johnson
By his Attorneys

UNITED STATES PATENT OFFICE.

EDWARD H. JOHNSON, OF NEW YORK, N. Y.

POWER-TRANSMITTING DEVICE FOR ELECTRIC RAILWAYS.

SPECIFICATION forming part of Letters Patent No. 450,744, dated April 21, 1891.

Application filed October 11, 1890. Serial No. 367,840. (No model.)

*To all whom it may concern:*

Be it known that I, EDWARD H. JOHNSON, a citizen of the United States, residing in New York city, county and State of New York, have invented a certain new and useful Improvemement in Power-Transmitting Devices for Electric Railways, of which the following is a specification.

My invention relates mainly to the application of electric motors to the propulsion of street-cars and other vehicles.

A portion of such invention relates to devices for transmitting power between such motors and the wheels of the vehicle, portions of which devices are applicable to the transmission of power or motion between moving parts in other situations, as will be hereinafter explained.

More especially my invention relates to certain improvements upon the construction set forth in my application filed August 18, 1890, Serial No. 362,296, in which I employed a nut or sleeve keyed on the axle which is geared with the driving-motor and threaded upon said nut or sleeve another similar one, these sleeves being situated with relation to a friction device, so that by movement of the axle in either direction such friction device is impelled toward the car-wheel with the result of producing a frictional connection therewith sufficient to start the car. In said application I also showed and described the providing of the members of the screw with stops situated with such relation to the safe capacity of the motor that the increase of the frictional engagement beyond such capacity was prevented. These devices I employ also in connection with my present invention. Where screw-threaded sleeves are employed in the manner set forth in the application referred to, it is necessary in order that they shall return readily to their normal position when the application of power is removed to make the screw-thread of a long pitch; but it is also necessary in using electric motors on railways to permit the motor when the car is started to make one or more revolutions before its power is applied to the wheels. To do this with a long-pitched screw-thread required that the sleeves should have a considerable travel, and in view of the limited space for the apparatus in street-cars this objection is one which I have found it desirable to obviate.

To this end a portion of my present invention consists in the use of what I term a "compound nut." This consists of any required number of concentric sleeves, the inner one being keyed upon the shaft to be turned and having an external screw-thread, the next one being threaded both internally and externally, and so on until the outer one is reached, this being threaded internally only and being adapted to receive motion from the source of power. The threads upon these sleeves are made of long pitch, each sleeve being usually provided with several separate channels extending from one end to the other, so that there are several distinct screw-threads, each of long pitch. It will be seen that when power is applied to the outer sleeve to turn it the outer sleeve will tend to be screwed along the next one to it, while this next one will tend to move in the opposite direction, and so on, the alternate sleeves traveling in the same direction. I make use of this movement to impel a friction device toward a friction-surface of the wheel, this being done through the medium of an elastic cushion, preferably a spring, which is compressed against the friction member and determines the frictional engagement in accordance with the load. It will be seen that the power is thus not applied at once to start the car, but only to compress the spring, and the car will not start until the sleeves have made sufficient revolutions to compress the spring enough to furnish the necessary friction. It will be seen that by multiplying the number of sleeves the number of revolutions required to effect this is correspondingly increased, and I am thus enabled to obtain a greater number of revolutions without shortening the pitch of the screw-threads and without increasing the lateral travel of the apparatus.

My invention consists, further, in the application of such a compound nut to electric-railway cars and its combination with other devices connected therewith, as will be hereinafter explained.

My invention is illustrated in the accompanying drawings.

Figure 1 is a top view of a street-car truck embodying all the features of my invention; Fig. 2, a longitudinal section of the compound nut; Fig. 3, a side elevation of the same, with the sleeves projecting one from another; Fig. 4, an end view of the same; Fig. 5, a face view of the friction-ring which I prefer to use; Fig. 6, a section, on a larger scale than Fig. 1, of the preferred arrangement of the car-wheel and friction devices; and Fig. 7, a section of the sleeve which incloses the shaft in this arrangement.

In Fig. 1 I have shown upon the same truck two different forms of friction devices. That which I prefer to employ is shown at the right-hand end of the sheet. It will be understood that in practice the same form of friction device will preferably be used at both ends of the car, but for convenience of illustration I have shown the two different forms on the same car. Considering, then, the device shown at the right-hand end of Fig. 1, the axle A is provided with a sleeve B, extending from one wheel to the other, the sleeve having internal shoulders $a$, Fig. 7, which form bearings for said sleeve, the sleeve not being in contact with the axle at other points. At each end of the sleeve B it is formed or provided with a flange $b$, outside of which is fixed upon the axle the car-wheel C. The car-wheel has attached to it an inwardly-extending hub or ring D, this being preferably made in sections secured to the wheel by bolts $c$, so as to be readily removable, if desired.

Placed loosely upon the outside of the sleeve B is a beveled ring $d$, which forms a wedge entering between the parts of the sectional friction-ring $e$. As shown in Fig. 5, this is a split ring made in three parts and beveled on its inner edge. Each of the three parts of which the ring is made is provided with a rib $f$ on its outer side, and these ribs enter slots in the flange $b$, so that the split ring $e$ is prevented from turning, but its parts are enabled to move outwardly against the hub D when the wedge $d$ is forced against their inner beveled side.

Upon the sleeve B is coiled a spiral spring E, which forms the elastic cushion determining the frictional engagement. It will be understood that at the other end of the axle A and sleeve B there is a similar device for communicating motion to the wheel C'. D' is the hub secured to said wheel, and E' the spiral spring or elastic cushion at that end of the axle.

At the middle portion of the axle, between the springs E and E', is placed the compound nut N', which has already been generally referred to and which is shown in detail in Figs. 2, 3, and 4. For simplicity of illustration the sleeve B is not shown in this figure; but the device is shown as placed directly on the axle, as I sometimes employ it in practice, as I shall presently explain.

Keyed to the axle A (or, in the other case, to the sleeve B) is a sleeve $g$, having an external screw-thread. Outside of this is a sleeve $h$, and outside of this a sleeve $i$, the sleeves $h\ i$ being each screw-threaded, both internally and externally. External to the sleeve $i$ is an outer sleeve $k$ with an internal screw-thread. As is indicated in Fig. 3, the screw-threads are not continuous, but each one is made up of a number of separate channels or ribs, each extending from one end of the sleeve to the other.

In order to limit the travel of the sleeves on each other with reference to the safe capacity of the apparatus, one of the channels of each external screw-thread is provided with a groove $l$, extending from one end of the thread nearly to the other end, and the corresponding rib of each internal screw-thread is provided with a pin $l'$, projecting into the said groove. Thus when they are turned in one direction the pin will travel in the groove until it reaches the end thereof, and further movement in that direction will be stopped. Another channel of each external screw-thread is provided with a groove $l^2$, whose open end is at the same end of the sleeve as the closed end of the groove $l$, and which terminates near the end of the sleeve at which the groove $l$ is open. Pins $l^3$ enter the grooves $l^2$. This provides for movement of the sleeves in the opposite direction from before, since the first pin and groove will not in this case limit the movement, but the second set will. The stop-pins are screws passing through holes in the sleeves, so that they may be inserted after the sleeves are put together. It is evident that the number of concentric sleeves may be increased to any convenient extent with the result of increasing the number of free revolutions allowed the motor-armature.

At each end of the compound nut there is placed upon the shaft a sliding collar F or F', and these collars have face-grooves in which are set at intervals rollers $n\ n$, whose axis is at right angles to the shaft, and is formed by pins $m$, extending from the periphery of the collar toward the shaft.

The other axle A' of the vehicle being provided with similar devices to those just described, the preferred arrangement for the motors to propel the vehicle is as follows: G is the upper frame of the truck, which is supported by springs from the axles, and which rigidly carries the car-body. Extending across this frame at a sufficient distance below it to provide room for the motors are two cross-beams H H. The motors shown have field-magnets of the Siemens type, and are rigidly secured to the cross-beams H by means of bolts $o$, passing through ribs projecting from their yokes at each end. The armatures I I' are placed upon a common armature-shaft K, having bearings at each end, (extending from the field-magnets,) these bearings being readily accessible from the sides of the car. The commutators, being placed at the inner ends of the armatures, are close together, so that they can be inspected simultaneously by opening a single trap-door in the bottom of the car. Between the two commutators on the shaft K are mounted two sprocket-wheels $p$ $p'$. From the sprocket-wheel $p$ a sprocket-chain L extends to a larger sprocket-wheel M, fixed upon the outer sleeve of the compound nut N, and from the sprocket-wheel $p'$ a sprocket-chain L' extends to a sprocket-wheel M' on the outer sleeve of the compound nut N'.

It will be seen that when the two motors are started the revolution of the armature-shaft K will be such as to turn both axles in the same direction, and thus to propel the car. Referring to the device of Fig. 6 and the right-hand end of Fig. 1, the motion first turns the outer sleeve of the compound nut, and the effect of the application of power will be to cause the sleeve $k\ h$ to be screwed up in one direction—say against the collar F'—while the sleeves $g\ i$ will be screwed out in the other direction and against the collar F. The rollers $n$ are provided for the purpose of preventing excessive friction of the ends of the sleeves against the collars, so as to let the sleeves turn easily. If the power is applied to start the car in the other direction, the motion of the two pairs of sleeves will be reversed, the sleeves $g\ i$ being forced against the collar F' and the sleeves $h\ k$ against the collar F. The turning of the sleeve B of course does not affect the wheels. In either case the result is to compress the springs E E'. The pressure of the springs E E' causes the wedges $d$ to be pushed in between the segments of the split collars $e$ and wedges these segments out against the hubs D, so as to apply friction to the hubs and turn the wheels. The amount of friction will of course depend on the degree to which the springs are compressed, and this in turn depends upon the extent of movement of the compound nut, which is itself dependent on the load to be started by the motor. The greater the load the greater will be the movement necessary to compress the springs with sufficient force to give the necessary friction to turn the wheels and axle. The provision of the sleeve B surrounding the axle permits the wheels to be fixed upon the latter instead of being loose thereon, as in my prior application, already referred to, since such sleeve forms the necessary support independent of the wheels for the actuating-nut.

The limiting stops, already described, in the screw-threads prevent the motors from exceeding their safe capacity in starting. Such stops are so situated that in case the load is too heavy for the motor to start the stops will engage at a little before that point in the movement of the compound nut, at which the safe capacity of the motors is attained, so that at this point any further increase of friction between the collar $e$ and the hub D is prevented, and the surfaces will slip on each other and the motor will continue to run, developing its full capacity, but not exceeding the same until relieved. When the current is cut off from the motors and power, therefore, ceases to be applied to the external sleeves of the compound nuts, the pressure which has tended to keep the springs compressed being thus removed, such springs force the nut-sleeves back along their long-pitch screw-threads to their normal position, so that the friction is removed from the wheels and the car is allowed to stop; or in running on a downgrade the wheels may continue to run without running the motor. In forcing back the nut-sections the spring causes the same to turn in the opposite way from that in which they had been previously turned by the motors, and this tends to produce a reversal of the motors, which assists in stopping the same.

The form of friction device shown at the left-hand end of Fig. 1 of the drawings differs somewhat from that heretofore described, although the general operation is the same. In this arrangement the sleeve B, which in the form already described constitutes the shaft of the compound nut, is not used; but the wheel $C^2$ is loose on the axle A', being placed thereon between fixed collars $r\ b$. The hub D' of said wheel extends out over the shaft as before, while upon the shaft is placed the beveled collar $d$ to act as a wedge. In operation the wedge $d$ forces the segments of the collar $e$ out against the hub D' as has already been described.

It is considered desirable in electric-railway cars to provide each car with two motors, so that in case of accident to the armature of one of them the other may be made use of. It is for this reason that I provide two motors with my arrangement; but I so connect them, they being provided with a common armature-shaft as we have seen, that in practice they operate together as one motor, although they are geared to different axles. Instead of a continuous shaft, however, the shafts of the two armatures may be separated at the center and normally joined by a suitable clutch, so that in case of accident to one armature the other may, if desired, be disconnected and run separately. An additional bearing is in this case provided for the inner ends of the armature-shafts. By employing sprocket-gearing the horizontal motion of the nuts on the axles is allowed for and also such vertical movements of the car-body on its springs as may occur, and I am thus enabled to carry the motors wholly on the truck-frame instead of having to carry the same upon rigid frames supported upon the axles.

What I claim is—

1. The combination, in a frictional device for transmitting power, of a source of power, a driven part, a movable friction member adapted to engage the latter, a compound nut composed of several concentric screw-threaded sleeves in such mechanical relation to the friction member as by their longitudinal movement to move the same into engagement with the driven part, the same being connected with the source of power so as to be revolved thereby, and an elastic cushion opposing the longitudinal movement of said sleeves, substantially as set forth.

2. A compound nut for the transmission of power by friction, the same consisting of several concentric sleeves having engaging screw-threads, each sleeve having several independent threads of long pitch, substantially as set forth.

3. In a frictional apparatus for transmitting power, the combination, with a movable friction member, of a device for moving the same into engagement consisting of several concentric screw-threaded sleeves, the outer one being connected with the source of power, and the same being adapted to engage and move the friction member, and an elastic cushion opposing the movement of said sleeve, substantially as set forth.

4. The combination of a shaft, a friction member at each end thereof for engaging a part to be turned by said shaft, a compound nut at the middle part of the shaft, and springs coiled on the shaft between each end of said nut and the corresponding friction member, substantially as set forth.

5. The combination of a shaft, a compound nut thereon, a sliding disk at each end of said nut, a spring pressing against said disk, the friction members at the ends of such springs, and the opposing driven parts having frictional surfaces with which the same are adapted to engage to turn them, substantially as set forth.

6. The combination of a shaft, a friction member at each end thereof for engaging a part to be turned by said shaft, springs coiled on the shaft, one for each friction member, concentric screw-threaded sleeves between said springs, and connections with the source of power for rotating said sleeves, substantially as set forth.

7. The combination of an axle, a wheel secured thereon, a loose sleeve on the axle, a movable friction member for engaging the wheel, and a screw for moving said friction member, consisting of concentric screw-threaded sleeves movable on said loose sleeve and connected with the source of power and adapted to engage and move the friction member into frictional engagement with the wheel, substantially as set forth.

8. The combination of a shaft, a friction member at each end thereof for engaging a part to be turned by said shaft, a compound nut at the middle part of said shaft adapted to engage and move the friction members, and elastic cushions opposing the travel of said nut, substantially as set forth.

9. The combination of the shaft, the concentric screw-threaded sleeves thereon, the spring and the friction member, the disk between said sleeves, and the spring provided with rollers on its face to receive the thrust of the sleeves, substantially as set forth.

10. The combination of the wheel, the independent shaft, the split friction-ring, the wedge for forcing the same against the wheel, the movable nut on the shaft for moving said wedge, and the spring opposing the travel of said nut, substantially as set forth.

11. The combination of the wheel, the independent shaft, the hub of said wheel extending over said shaft, the split beveled friction-ring within said hub, the beveled wedging-ring engaging with the split ring to wedge it against the hub, the movable nut on the shaft for moving the wedging-ring, and the spring opposing the travel of said nut, substantially as set forth.

12. The combination of the axle, the wheel fixed thereon, the sleeve loose on the axle, the split friction-ring, the wedge for forcing the same against the wheel, the nut on the sleeve for moving said wedge, and the spring opposing the travel of said nut, substantially as set forth.

13. The combination of the two wheels, the independent shaft, the split friction-rings, one for each wheel, the wedges for forcing the same against the wheels, the concentric screw-threaded sleeves on the shaft for moving both said wedges simultaneously, and the springs opposing the travel of said sleeves, substantially as set forth.

14. The combination of two concentric screw-threaded sleeves for moving a friction device into engagement, one of the sleeves having a pin projecting into a closed groove in the screw-thread of the other, substantially as set forth.

15. The combination of two concentric screw-threaded sleeves for moving a friction device into engagement, each sleeve having several independent threads, one of said sleeves having a groove in one of its channels extending from one end of said channel nearly to the other end, and a groove in another channel whose situation is reversed, and the other sleeve having two pins near opposite ends, one projecting into each of said grooves, substantially as set forth.

This specification signed and witnessed this 9th day of October, 1890.

EDWD. H. JOHNSON.

Witnesses:
W. PELZER,
D. H. DRISCOLL.